F. F. DORSEY.
VEHICLE WHEEL.
APPLICATION FILED FEB. 29, 1908.
1,032,125.
Patented July 9, 1912.
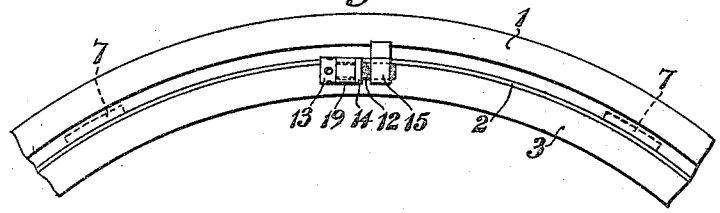
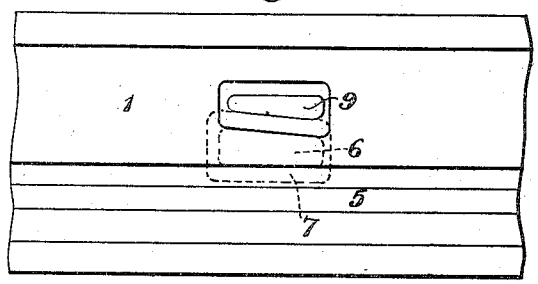
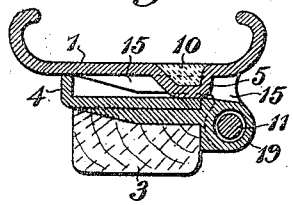
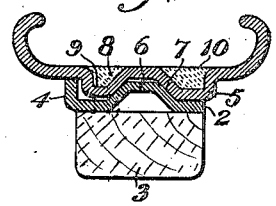
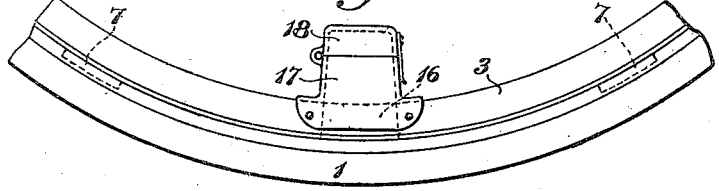
Witnesses
Inventor
Farnum F. Dorsey

UNITED STATES PATENT OFFICE.

FARNUM F. DORSEY, OF NEW YORK, N. Y., ASSIGNOR TO AMOS WOEBER, OF DAVENPORT, IOWA.

VEHICLE-WHEEL.

1,032,125.

Specification of Letters Patent.    Patented July 9, 1912.

Application filed February 29, 1908. Serial No. 418,462.

*To all whom it may concern:*

Be it known that I, FARNUM F. DORSEY, a citizen of the United States, residing at New York, in the county of New York and State of New York, have invented certain new and useful Improvements in Vehicle-Wheels, of which the following is a specification.

My invention relates to vehicle wheels of the type in which a tire rim, adapted to support an inflated pneumatic tire, is removably mounted on a felly and secured thereto by fastening devices designed to permit the ready removal of the rim and tire and the substitution of another rim with an inflated tire thereon.

Rims of the kind above referred to are usually designated as "demountable rims", and are used to permit the convenient replacement of pneumatic tires injured upon the road.

The object of the present invention is to produce a vehicle wheel provided with a demountable rim in which the construction is simple, inexpensive, and light in weight, while the means for detachably securing the rim to the felly are so simplified and improved as to permit the rim to be removed or replaced with minimum inconvenience and expenditure of time, while acting to lock the rim securely in place when in use.

In the drawings Figure 1 is a side elevation of the upper portion of a rim and felly embodying the present invention, showing the fastening screw. Fig. 2 is a plan view of a portion of the rim, showing the manner in which the interlocking projections are engaged. Figs. 3 and 4 are transverse sections of the rim and felly taken at different points. Fig. 5 is a side elevation of the lower portion of the demountable rim, and the felly, showing the casing for the tire-valve stem.

The illustrated embodiment of the invention comprises a tire rim 1 removably mounted on a fixed rim 2 which is permanently secured, in any convenient manner, to the wooden felly 3 of the wheel. The felly 3 is mounted, in the usual manner, on the spokes and hub of the wheel. The tire rim 1 is of the ordinary clencher type, and is rolled from sheet metal in the usual manner. The fixed rim is also formed of sheet metal, and at one side it is provided with an annular outwardly-projecting flange 4, which engages the inner surface of the tire-rim, so that there is a substantial space between the two rims. On the side opposite to the flange 4 the tire-rim is provided with an annular inwardly-projecting flange 5, formed by rolling a channel in the sheet metal of the rim. This flange engages the outer surface of the fixed rim.

The means for detachably locking the tire-rim in place on the fixed rim comprise interlocking projections and recesses on these members, located in the space between the flanges 4 and 5 so as to be inclosed and concealed thereby. The fixed rim is provided with outward radial projections 6, formed by pressing portions of the sheet metal outward, and these projections are located at convenient intervals about the periphery of the fixed rim, the number being variable according to the conditions of service. These projections 6 are adapted to enter recesses between the flange 5 and coöperating projections 9 on the tire rim, the projections 9 being formed in the same way as the projections 6 and being correspondingly spaced. This arrangement is such that the projections 6 may be engaged with or disengaged from the projections 9 by a rotative movement of the tire-rim on the fixed rim, and when so disengaged the tire rim may be removed from the fixed rim by a lateral movement.

When the projections are in engagement they prohibit lateral movement of the tire-rim on the fixed rim. In order that there may be no looseness between the projections which would permit rattling or wear of the parts, the projections are formed to have a wedging action both laterally and radially, so that both lateral and radial movement of the tire-rim are entirely prevented. To this end the lateral surfaces 7 and 8 of the projections 6 are inclined, and the corresponding surfaces of the flange 5 and the projections 9 are correspondingly inclined, while the surfaces 8 and the inner surfaces of the projections 9 are also inclined longitudinally.

Although the flanges have a slight clearance from the opposite surfaces of the members to permit the easy removal and replacement of the tire-rim, they are substantially in contact with these surfaces, so that although the rim is normally supported by the interlocking devices the entire support of the rim, when the wheel is in use, does not depend on the latter, but a slight yielding of the rim under the weight of the vehicle causes it to engage and be supported by the flange 4, while the flange 5 similarly engages the fixed rim and supports the rim at the other side. In order to afford a smooth inner surface in the tire-rim to support the base of the tire, the depressions therein may be filled with any suitable filling 10, such as rubber composition or leather.

To draw the interlocking projections firmly into, and maintain them in, engagement with each other, means are provided for causing a rotative movement of the tire-rim on the fixed rim, these means comprising a screw 11 engaging lugs on the rims. The screw has a threaded portion 12, a head 13 and a flange 14. The threaded portion engages a threaded hole in a lug 15 fixed to the tire-rim, while the shank of the screw passes through a hole in a lug 19 fixed to the fixed rim, the screw being fixed against longitudinal movement therein by the engagement of the head and the flange with opposite sides of the lug 19. The flange may be made of a separate metal washer or collar fixed to the screw after the latter has been inserted in the lug 19. The head of the screw is laterally perforated so that the screw may be turned by a suitable tool.

The felly and the fixed rim 2 are provided with an opening 16 to receive the tire-valve stem in the usual manner, this opening being sufficiently elongated to permit the rotative movement of the tire-rim on the fixed rim. To cover this opening and protect the valve stem a casing 17 is fixed to the felly and provided with a cover 18 which may be opened to afford access to the valve.

To apply the tire-rim to the wheel with an inflated pneumatic tire in place on the rim, the lower portion of the rim is first engaged with the fixed rim, the valve stem being inserted in the opening 16, and the upper portion of the rim is then swung laterally into position, the relative positions of the parts at this time being such that each projection 9 is somewhat to the right, and clear of, the corresponding projection 6. The rim is then turned by hand to the left until the screw 11 engages the lug 15, and the rim is turned into final locked position by the use of the screw. To remove the rim the screw is turned in the opposite direction, and thus any sticking resulting from rust or the wedging action of the parts may be easily overcome.

The projections on the rims are accurately spaced, so that they may all engage and wedge at once, but any slight inaccuracy is compensated for by the elasticity of the tire rim, and this advantage is increased by the manner in which the projections are formed. The walls of the projections, being formed by pressing, are somewhat thinner than the metal of the body of the rim, so that in case one pair of projections engages before the others they may yield slightly to facilitate the firm engagement of the other projections.

The applicant is aware that rims for pneumatic tires have been used in which one or both of the lateral tire-retaining flanges is removable to facilitate the removal and replacement of the tire, but the present invention is essentially different from such devices, since its use does not involve the removal of the tire from, or its placement in, the rim, or the deflation and inflation of the tire.

Various modifications may be made in the construction and operation of the illustrated embodiment of my invention within the spirit and scope of the invention as defined in the following claims.

I claim:—

1. A wheel having, in combination, a tire-rim adapted to support an inflated pneumatic tire, a fixed rim, disengageable connections for locking the tire-rim to the fixed rim comprising interlocking projections on the rims and engageable by relative rotation of the rims, and unitary means normally connecting the rims and constructed and operating to rotate the tire-rim to either locked or unlocked position and to retain it in locked position.

2. A wheel having, in combination, a fixed rim and a tire rim, an annular flange near one side of the tire rim beveled on its inner surface, a plurality of spaced projections on the inner surface of the tire rim having surfaces inclined toward said flange, and a plurality of tapered projections on the fixed rim formed to engage and wedge between the flange and projections on the tire rim when the latter is rotated upon the fixed rim.

3. A wheel having, in combination, a fixed rim and a demountable tire rim, a vertical flange on the outside edge of one of the rims, a wedge on the rim with said flange, the wedge being inclined from the flange toward the opposite side of the wheel, and a wedge on the other rim formed and adapted to be moved into engagement with the first-named wedge between the flange and the first named wedge by a relative rotative movement of the two rims.

In testimony whereof, I affix my signature in presence of two witnesses.

FARNUM F. DORSEY.

Witnesses:
  G. IRVING ABENDROTH,
  GRACE CARSS.